United States Patent
Roberts

[15] 3,656,532
[45] Apr. 18, 1972

[54] ASYMMETRIC TIRE

[72] Inventor: Charles W. Roberts, Akron, Ohio

[73] Assignee: The Goodyear Tire & Rubber Company, Akron, Ohio

[22] Filed: Dec. 22, 1969

[21] Appl. No.: 887,246

[52] U.S. Cl. .......................................................... 152/353
[51] Int. Cl. ............................................................ B60c 3/00
[58] Field of Search ............................................ 152/352, 353

[56] References Cited

UNITED STATES PATENTS

| | | | |
|---|---|---|---|
| 1,874,120 | 8/1932 | Quynn | 152/352 |
| 2,108,329 | 2/1938 | Carter | 152/166 |
| 2,996,096 | 8/1961 | Powers | 152/352 |
| 3,233,649 | 2/1966 | Jolivet et al. | 152/361 |
| 3,435,875 | 4/1969 | Devienne | 152/356 |
| 3,554,259 | 1/1971 | Webb | 152/352 |

Primary Examiner—Arthur L. La Point
Assistant Examiner—Robert Saifer
Attorney—F. W. Brunner and Michael L. Gill

[57] ABSTRACT

A pneumatic tire having a substantially cylindrical tread portion the centerline of which is offset axially with respect to a pair of bead portions and having a portion of one sidewall only extending primarily in the axial direction outwardly of and from one bead member.

The foregoing abstract is not to be taken as limiting the invention of this application, and in order to understand the full nature and extent of the technical disclosure of this application, reference must be made to the accompanying drawing and the following detailed description.

20 Claims, 4 Drawing Figures

ASYMMETRIC TIRE

This invention relates to pneumatic tires, and more particularly to a novel asymmetric tire construction.

Figure 1:
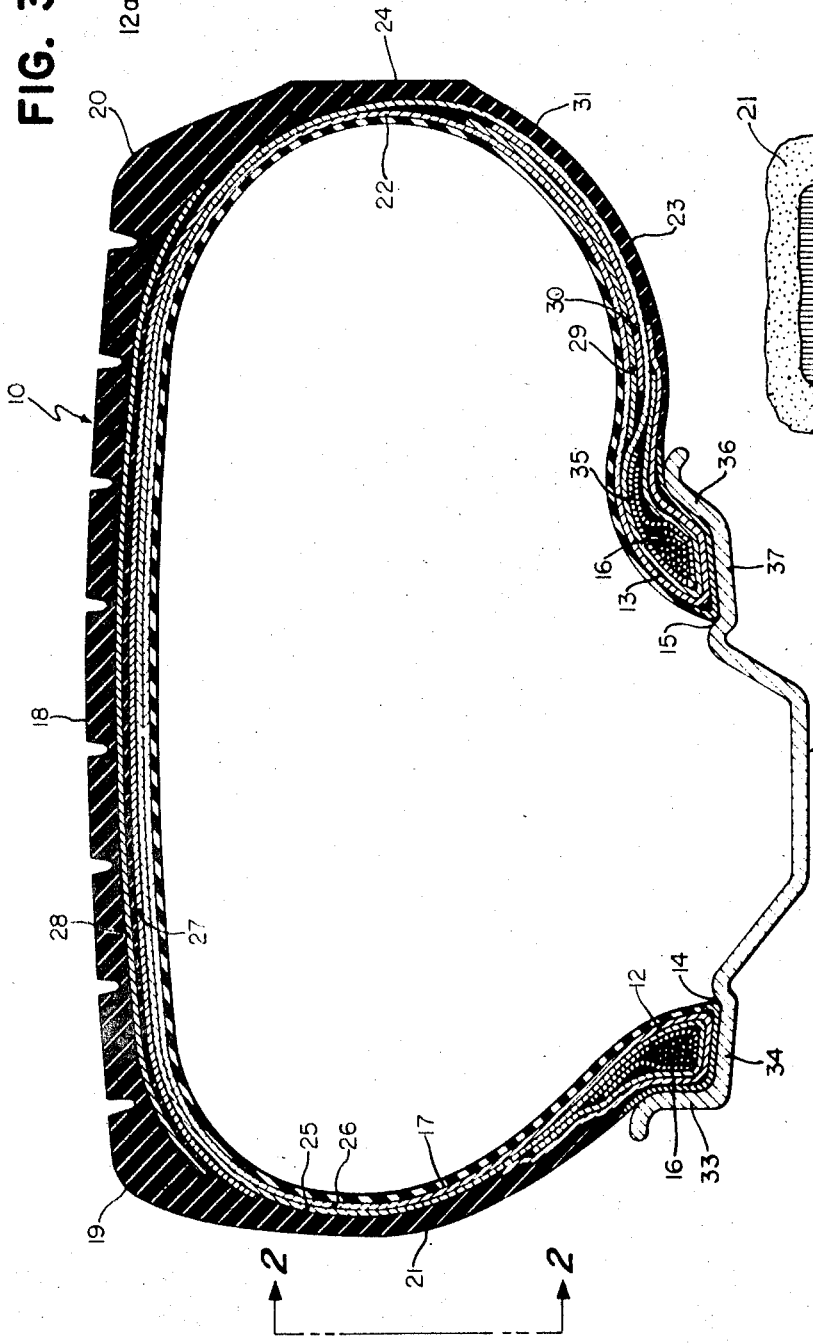
FIG. 1 is a cross-sectional view of an inflated tire constructed in accordance with this invention.

With reference to FIG. 1, a tire 10 constructed in accordance with the present invention is illustrated in its inflated condition and mounted on a drop center rim 11. First and second bead portions 12 and 13, respectively, are seated in first and second bead seats 14 and 15, respectively, on the rim 11 and are in air-tight relationship therewith. Each bead portion 12 or 13 has a substantially inextensible annular bead core 16 disposed therein. For purposes of this invention the diameter of a bead portion 12 or 13 shall be the mean hoop diameter of its respectively associated bead core 16.

The first bead seat 14 has a flange 33 which extends substantially radially outwardly of and from the generally cylindrical base 34 of the first bead seat 14. The second bead seat 15 has a flange 36 which is substantially conical in shape. In other words, the flange 36 extends radially and axially outwardly of and from the generally cylindrical base 37 of the second bead seat 15.

A carcass 17 extends circumferentially of the tire 10 and from the first bead portion 12 to the second bead portion 13. A generally cylindrical tread portion 18 extends circumferentially of the tire 10 and terminates at its lateral edges in first and second shoulder portions 19 and 20, respectively. For purposes of this invention a tread shall be considered substantially cylindrical when the tread radius is in excess of 8 inches. The tread radius is the radius of curvature of the tread surface at the mid-circumferential centerline in planes containing the rotational axis of the tire when the tire is inflated to design inflation pressure and unloaded. For purposes of this invention the "tread portion" 18 of the tire 10 shall be that portion of the tire that will engage a flat tread supporting surface in a plane containing the rotational axis of the tire and perpendicular to the tread supporting surface when the tire is inflated to design inflation pressure and loaded in the radial direction only to design radial load. For purposes of this invention design radial load and design pressure shall be that load or pressure under which the tire is designed to normally operate. The "mid-circumferential centerline" of the tread is a line which lies on the tread surface and midway between the lateral edges or shoulders 19 and 20 of the tread 18.

The first shoulder 19, when the tire is inflated and unloaded, is disposed generally radially outwardly of the first bead portion 12. A first sidewall 21 extends generally radially of and from the first bead member 12 to the first shoulder 19. Although the first sidewall 21 is described as extending generally radially outwardly of and from the bead portion 12, it will be appreciated that this first sidewall 21 bulges axially outwardly with respect to the tire to a certain extent forming a smooth convexly curved sidewall.

The second shoulder 20 is disposed radially outwardly with respect to the second bead portion 13 but is displaced substantially axially outwardly therefrom. It can be readily seen therefore that the mid-circumferential centerline of the tread 18 is axially displaced from the mid-circumferential centerplane of the bead portions 12 and 13. The mid-circumferential centerline is offset from the mid-circumferential centerplane a distance equal to at least 5 percent of the tread width when the tire is inflated to design inflation pressure and unloaded. For purposes of this invention, the mid-circumferential centerplane of the bead members shall be a plane which is perpendicular to the rotational axis of the tire and is disposed midway between the bead portions 12 and 13 when the tire is mounted on a rim and inflated. The midpoint between the bead portions is the mid-point between the center of the two bead cores 16.

A second sidewall 22 extends between the second bead portion 13 and second shoulder 20. A first generally cylindrical portion 23 of the second sidewall 22 extends primarily in an axial direction outwardly of and from the second bead portion 13. A second portion 24 of the second sidewall 22 extends generally radially inwardly of and from the second shoulder 20. The first and second portions 23 and 24, respectively, of the second sidewall 22 converge at a generally smoothly convex portion 31 therebetween to form the complete second sidewall 22 extending from the second bead portion 13 to the second shoulder 20.

The tire is provided with stabilizing means to substantially restrict the axial displacement of the mid-circumferential centerline of the tread when a lateral load such as those encountered in high-speed turns is applied to the tread. Substantially restricting the axial displacement of the mid-circumferential centerline of the tread, for purposes of this invention, means that the lateral displacement of the tread when such lateral loads are applied thereto is limited in either lateral direction to less than the distance between the mid-circumferential centerline of the tread 18 and the mid-circumferential centerplane of the bead portions 12 and 13. The stabilizing means comprises the different arrangements of cord reinforcement hereinafter described.

Figure 2A:
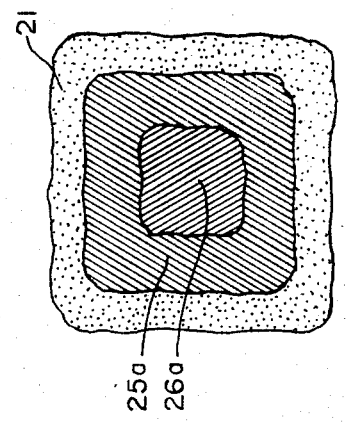
FIG. 2A is a fragmentary view of a portion of the tire of FIG. 1 taken substantially along line 2—2 of FIG. 1.

The tire 10 may be of either bias ply construction or radial ply construction. In the case of bias ply construction, the carcass 17 is comprised of at least two layers of tire cord fabric 25a and 26a (See FIG. 2A) extending from bead to bead. The cords in the individual carcass plies, in a specific example of a bias ply construction, extend at an angle of approximately 35° with respect to the mid-circumferential centerline at said centerline. As is normal in bias ply tires, the carcass plies 25 and 26 extend at opposite angles with respect to the mid-circumferential centerline, that is to say, the cords in the two carcass plies are crossed with respect to each other. A pair of cord reinforced belt plies 27 and 28 are disposed beneath the tread 18 and extend circumferentially of the tire 10 and substantially from the first shoulder 19 to the second shoulder 20. The cords in both belt plies in this specific example extend at an angle of approximately 25° with respect to the mid-circumferential centerline at the mid-circumferential centerline. A pair of sidewall reinforcing plies 29 and 30 are disposed in the first portion 23 of the second sidewall 22 and are located between the first and second carcass plies 25 and 26, respectively. Each sidewall reinforcing ply 29 or 30 is comprised of tire cord fabric disposed at an angle of approximately 18° with respect to a circle which is contained in a plane perpendicular to the rotational axis of the tire, is concentric with the rotational axis of the tire, and is coincident with the sidewall reinforcement 29 or 30 at the midpoint of the reinforcement. Again, the cords in the first sidewall reinforcement 29 are crossed with respect to the cords in the second sidewall reinforcement 30. In the specific embodiment illustrated, the sidewall reinforcing plies extend from a point axially outwardly of the bead seat 15 into the convexly curved portion 31 of the sidewall 22.

Figure 2B:
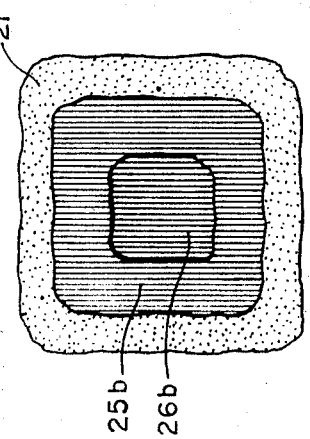
FIG. 2B is a fragmentary view of a portion of the tire of FIG. 1 taken substantially along line 2—2 and illustrating an alternate embodiment of this invention.

The carcass 17, as mentioned before, may also be of radial ply construction. In this case the carcass 17 would comprise one or more plies of generally radially extending tire cord fabric. For purposes of this invention a radial ply shall be a ply whose cords extend at an angle of at least 75° with respect to the mid-circumferential centerline. In a specific example of a radial ply tire the carcass plies 25b and 26b (See FIG. 2B) extend at an angle of approximately 88° with respect to the mid-circumferential centerline and are at alternately opposite angles with respect to the mid-circumferential centerline. Again, a pair of belt plies 27 and 28 are disposed beneath the tread portion and extend circumferentially of the tire and substantially from the first shoulder 19 to the second shoulder 20. In this specific example of a radial ply tire, the cords in the belt plies 27 and 28 extend at an angle of approximately 20° with respect to the mid-circumferential centerline and are at alternately opposite angles with respect to the centerline. A pair of sidewall reinforcing plies 29 and 30 are disposed in the generally cylindrical or first portion 23 of the second sidewall 22 and extend circumferentially of the tire. Again, these reinforcing plies 29 and 30 are located between the first and second carcass plies 25 and 26, respectively, and extend from a point axially outwardly of the bead seat 15 into the convex portion 31 of the sidewall 22.

Figure 3:
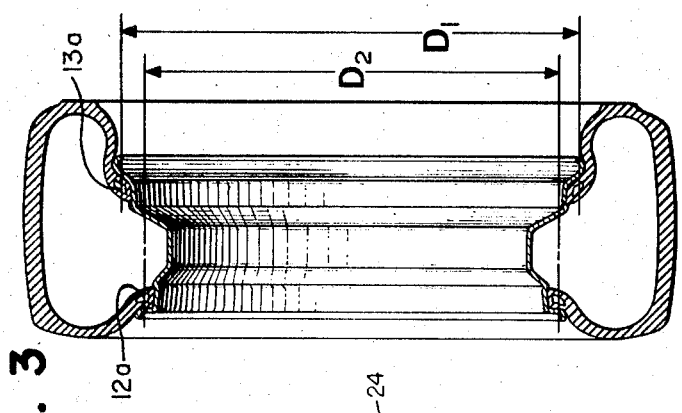
FIG. 3 is a cross-sectional view of an alternate embodiment of a tire constructed in accordance with this invention.

While in the specific embodiment illustrated, the sidewall reinforcing plies 29 and 30 are disposed between the first and second carcass plies 25 and 26 in both the case of the radial ply and bias ply construction, it is to be understood that one or more of these sidewall reinforcing plies 29 and 30 could be disposed either inwardly or outwardly of the carcass plies 25 and 26. It is also intended that although the belt plies 27 and 28 in both the radial and bias ply constructions are illustrated as being disposed radially outwardly of the carcass plies 25 and 26; one or more of these belt plies 27 and 28 may also be disposed radially inwardly of one or more of the carcass plies 25 and 26. It is further intended that this invention be not limited to two carcass plies but may contain one or more carcass plies in the case of the radial ply construction and two or more plies in the case of of the bias ply construction. The sidewall reinforcing plies 29 and 30 may also extend axially inwardly into the second bead portion 13 and could be wrapped around the respectively associated annular bead core 16. It should be noted further that although in the specific embodiment illustrated sidewall reinforcing plies 29 and 30 are present; that these sidewall reinforcing plies need not be utilized in either the bias ply construction of the radial ply construction. In addition, the belt plies 27 and 28, although preferred, may also be omitted in the bias ply construction. The tire may also be provided with a flipper 35 in one or the other of the bead portions 12 and 13 which comprises a fabric reinforcement wrapped around the respective bead core 16 and extending to or into the respective sidewall 21 or 22. Further, as seen in FIG. 3 the first and second bead portions 12a and 13a, respectively, may also be of different diameters D1 such as the second bead portion 13a having a larger diameter than the diameter D2 of the first bead portion 12a.

While certain representative embodiments and details have been shown for the purpose of illustrating the invention, it will be apparent to those skilled in this art that various changes and modifications may be made therein without departing from the spirit or scope of the invention.

I claim:

1. A pneumatic tire comprising a tread, a pair of bead portions spaced apart for engagement with a pair of bead seats on a tire rim and a sidewall extending between each bead portion and the tread, said tire being characterized by the mid-circumferential centerline of said tread being substantially offset laterally with respect to the mid-circumferential centerplane of said bead portions, stabilizing means disposed beneath said tread and extending from bead portion to bead portion substantially restricting the lateral movement of said mid-circumferential centerline relative to said mid-circumferential centerplane, and a portion of one sidewall only extending primarily in the axial direction outwardly of its respectively associated bead portion.

2. A tire as claimed in claim 1, wherein said stabilizing means comprises at least one radial ply of tire cord fabric extending circumferentially of said tire and from bead portion to bead portion and at least one belt ply disposed beneath said tread and extending circumferentially of said tire.

3. A pneumatic tire as claimed in claim 2, further including at least one reinforcing ply disposed in the axially outwardly extending portion of said one sidewall and extending circumferentially of said tire.

4. A tire as claimed in claim 1, wherein the diameter of one of said pair of bead portions is different from the diameter of the other one of said bead portions.

5. A tire as claimed in claim 1, wherein both bead portions of said pair of bead portions are of the same diameter.

6. A tire as claimed in claim 1, wherein said stabilizing means comprises a carcass having at least two bias plies of tire cord fabric extending circumferentially of said tire and from bead portion to bead portion.

7. A tire as claimed in claim 6, further including at least one reinforcing ply disposed in the axially outwardly extending portion of said one sidewall and extending circumferentially of said tire.

8. A tire as claimed in claim 6, further including at least one belt ply disposed beneath said tread and extending circumferentially of said tire.

9. A tire as claimed in claim 8, further including at least one reinforcing ply disposed in the axially outwardly extending portion of said one sidewall and extending circumferentially of said tire.

10. A tire as claimed in claim 9, wherein both bead portions of said pair of bead portions are of the same diameter.

11. A tire as claimed in claim 9, wherein one bead portion of said pair of bead portions is of different diameter than the other bead portion of said pair of bead portions.

12. A pneumatic tire having a tread and a pair of spaced apart bead portions, and a sidewall extending between each bead portion and said tread, said tire being characterized by at least one belt ply disposed beneath said tread portion and extending circumferentially of said tire, a tread radius greater than 8 inches when said tire is inflated to design inflation pressure and unloaded, and one sidewall only having a portion thereof extending primarily in the axial direction outwardly of and from its respectively associated bead portion.

13. A tire as claimed in claim 12, further including at least one radial ply of tire cord fabric extending circumferentially of said tire and from bead portion to bead portion.

14. A tire as claimed in claim 13, further including at least one reinforcing ply disposed in the axially extending portion of said one sidewall and extending circumferentially of said tire.

15. A tire as claimed in claim 12, in which one of said pair of bead portions is of different diameter than the other one of said pair of bead portions.

16. A tire as claimed in claim 12, in which both of said bead portions of said pair of bead portions are of the same diameter.

17. A tire as claimed in claim 12, further including at least two bias plies of tire cord fabric extending circumferentially of said tire and from bead portion to bead portion.

18. A tire as claimed in claim 17, further including at least one reinforcing ply disposed in the axially extending portion of said one sidewall and extending circumferentially of said tire.

19. A tire as claimed in claim 17, in which one bead portion of said pair of bead portions is of different diameter than the other bead portion of said pair of bead portions.

20. A tire as claimed in claim 17, in which both bead portions of said pair of bead portions are of the same diameter.

* * * * *

UNITED STATES PATENT OFFICE
CERTIFICATE OF CORRECTION

Patent No. 3,656,532          Dated April 18, 1972

Inventor(s) Charles W Roberts

It is certified that error appears in the above-identified patent and that said Letters Patent are hereby corrected as shown below:

Column 3, line 41, "D1" at the beginning of the line should be at the beginning of line 42 after "ter".

Signed and sealed this 5th day of September 1972.

(SEAL)
Attest:

EDWARD M.FLETCHER,JR.          ROBERT GOTTSCHALK
Attesting Officer          Commissioner of Patents